United States Patent [19]

Marten et al.

[11] 4,393,694

[45] Jul. 19, 1983

[54] VEHICLE STEERING AND FRONT-END ALIGNMENT DEFECT DETECTOR

[75] Inventors: John A. Marten, Wauconda; Donald Legler, Fort Wayne; Jesse W. Wagoner, Dundee, all of Ill.

[73] Assignee: Sun Electric Corporation, Crystal Lake, Ill.

[21] Appl. No.: 264,647

[22] Filed: May 18, 1981

[51] Int. Cl.³ .......................................... G01M 15/00
[52] U.S. Cl. .................................. 73/117; 33/203.13
[58] Field of Search .............. 73/117, 118; 33/203.13, 33/203.15

[56] References Cited

U.S. PATENT DOCUMENTS

| | | | |
|---|---|---|---|
| 2,598,599 | 5/1952 | Pleasance | 33/203.13 |
| 3,238,771 | 3/1966 | Myrtetus et al. | 73/117 |
| 3,238,772 | 12/1966 | Pellicciotti | 73/117 |
| 3,763,699 | 10/1973 | Sangster | 73/117 |
| 3,813,932 | 6/1974 | Wallace | 73/118 |
| 3,889,527 | 6/1975 | Wallace | 73/118 |
| 3,897,636 | 2/1975 | Leblanc | 33/203.13 |
| 4,158,961 | 6/1979 | Ben-David | 73/117 |

OTHER PUBLICATIONS

L. Hunter, Wheel Alignment Equals Motion Balance.

Primary Examiner—Jerry W. Myracle
Attorney, Agent, or Firm—Allegretti, Newitt, Witcoff & McAndrews

[57] ABSTRACT

An apparatus and corresponding method for detecting steering or front-end alignment defects in a vehicle, such as an automobile, having a steering wheel steerably connected to dirigible front wheels. Each side of the vehicle being tested is restrained from sideward motion by a retaining brace having a force transducer mounted therein. A roller mounted in a support floor rotates or allows the rotation of each of the front wheels of the vehicle. While the front wheels are rotated, the steering wheel of the vehicle is turned from center position through a relatively small angle of rotational to the right and then to the left (or vice versa). An angle indicating device measures the angles of steering wheel rotation. While the steering wheel is maintained momentarily at each of the respective angles of rotation, a rotating-force measuring device, such as a torque wrench, is used to measure the force exerted on the steering wheel and the force transducers, in cooperation with a readout device, are used to determine the force exerted on the respective retainers. All force values thus obtained are then mathematically compared to determine if a steering or front-end alignment defect exists in the vehicle.

16 Claims, 4 Drawing Figures

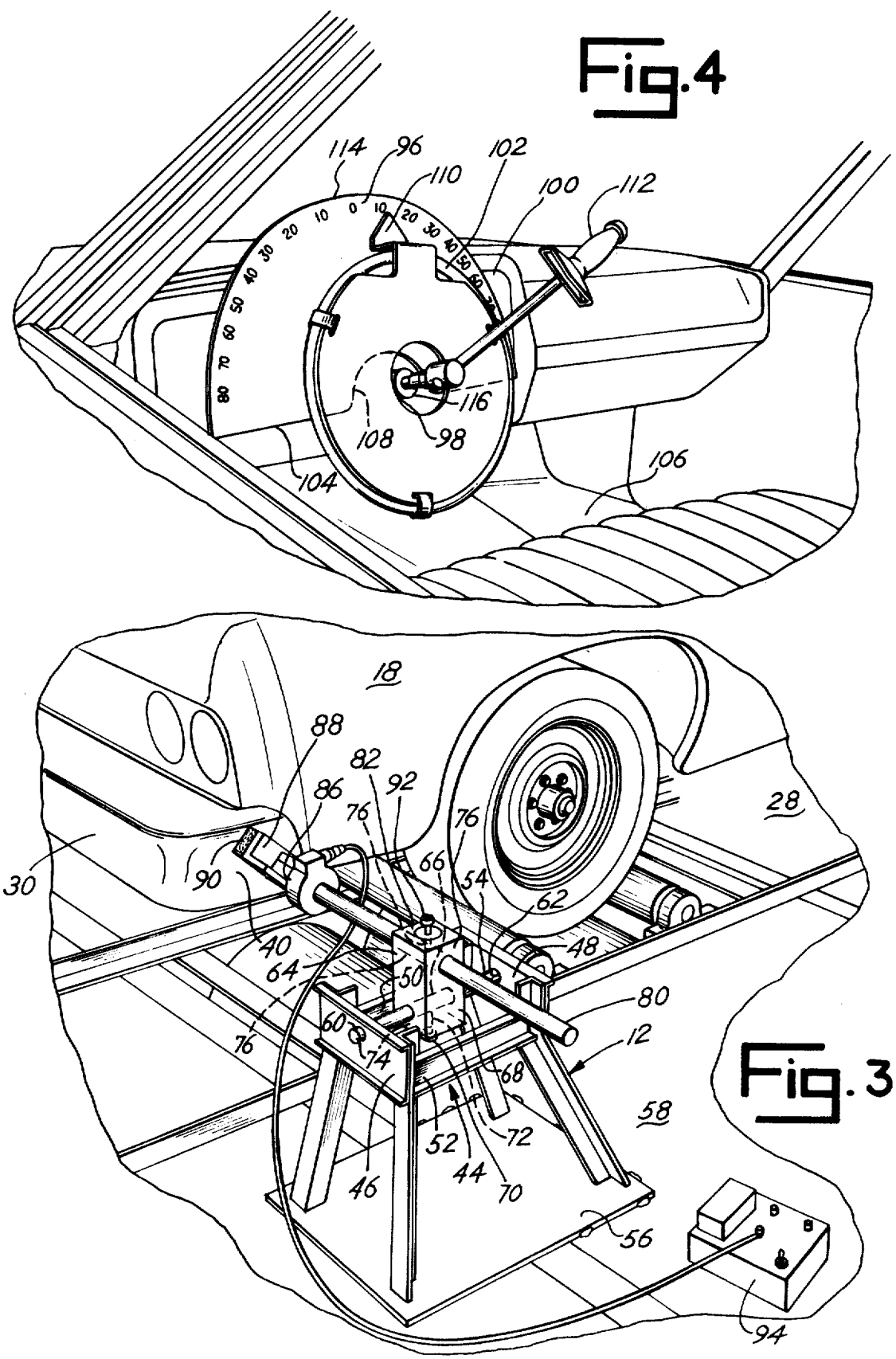

VEHICLE STEERING AND FRONT-END ALIGNMENT DEFECT DETECTOR

BACKGROUND OF THE INVENTION

This invention relates to a vehicle steering and front-end alignment defect detector and a method of using the device. More particularly, the invention disclosed herein relates to a device and method for quickly determining whether a steering or front-end alignment defect exists in a dirigible vehicle, such as an automobile, while stationary, by obtaining and comparing the values for steering gain when the vehicle's front wheels are rotated and the steering wheel of the vehicle is steered from center position in one direction and then in the opposite direction.

Although there are many devices in the prior art for detecting steering or front-end alignment defects they are customarily either very complex and cumbersome or very specialized and incapable of determining the existence of such defects in general. An example of the former can be found in the disclosure of U.S. Pat. No. 3,238,772, with which device the existence of such defects can be not only discovered to exist, but also structurally located within the vehicle with notable precision. However, because such devices attempt to diagnose the exact nature and location of any such defects found, they are fairly complex and bulky, often having numerous electronic, electro-mechanical, and mechanical components of substantial size.

Examples of the simpler, more specialized devices can be found in U.S. Pat. Nos. 3,889,527 and 3,813,932. Although each of the apparatus disclosed within them have relatively few and simple components, they both have rather limited applications. The device disclosed in the '527 patent is only intended to test for play in the linkage between the dirigible wheels and the steering wheel of a vehicle. The device disclosed in the '932 patent is an even simpler version of the same type of tool.

Hence, it is an object of the present invention to create a relatively uncomplicated device for quickly detecting the existence, not necessarily the exact nature or location, of any type of steering of front-end alignment defect in vehicles having dirigible front wheels. It is also an object of the present invention that the defect detecting device be less bulky or cumbersome than the diagnostic devices that exist in the prior art.

In the prior art, there are many different types of chassis dynamometers and roller brake testers that are widely used in the vehicle testing industry. Such devices often provide at least one roller for rotating the dirigible front wheels of various types of vehicles, including automobiles, during testing. Since such prior art devices are in widespread use, it is also an object of the present invention to develop a vehicle steering and front-end alignment defect detector that can be used in conjunction with certain of the existing chassis and brake testing machinery in the prior art that utilize such rollers.

In addition, it should be noted that the disclosures in the prior art that can be utilized to diagnose the existence or location of a steering or front-end alignment defect have not shown, mentioned, or suggested the detection of such defects by means of the steering gain concept (the ratio of the force exerted by the rotation of the front wheels in urging the vehicle in the direction turned toward by the operator to the force exerted by the operator in turning the steering wheel). It is therefore a further object of the present invention to use the steering gain concept to detect such defects through use of the steering gain concept.

Lastly, it is nowhere suggested in the prior art that such steering gain can be measured by (1) rotating the front wheels of the vehicle while the vehicle remains stationary, (2) determining the force exerted by the operator in turning the steering wheel, and (3) measuring the force exerted by the front sides of the vehicle on a side motion restraining device having a vehicle urging force determining apparatus mounted therein. It is therefore yet another object of the present invention to use the steering gain concept to determine the existence of a steering or front-end alignment defect in vehicles by means of a front wheel roller or rollers, a steering wheel rotating force determining device, and side motion retainers with vehicle force determining apparatus mounted therein. Additional objects and advantages obtained by the present invention will become readily apparent as the following specification proceeds.

SUMMARY OF THE INVENTION

The foregoing objects are accomplished by my invention of an apparatus and corresponding method for detecting defects in vehicles that have a front portion with a first side and a second side, a rear portion, at least two front wheels steerably mounted in the front portion of the vehicle, a rear means for mobile support of the rear portion, and a steering means for steering the front wheels. The steering means in the vehicle being tested includes a steering rod rotatable around an axis of rotation, a steering wheel rotatably mounted about the axis of rotation and connected to the steering rod, and a connecting means for steerably connecting the steering rod to the front wheels of the vehicle. The vehicle's steering wheel is in a center position when the front wheels are aligned for forward motion of the vehicle.

The apparatus is comprised of at least five elements: a wheel rotating means, a first retaining means, a second retaining means, an angular rotation measuring means, and a steering force measuring means. The wheel rotating means rotates each of the vehicle's front wheels when the steering wheel is turned through a relatively small angle to the first or second side of center position. The first retaining means retains the vehicle from movement in the direction of the vehicle's first side, and the second retaining means retains the vehicle from movement in the direction of the vehicle's second side. Each retaining means has a force determining means for determining the force exerted by the vehicle on the retaining means when the steering wheel is rotated from center position through a relatively small angle of rotation to urge the side of the vehicle against the retaining means. The angular rotation measuring means measures the angular rotation of the steering wheel about the rotational axis of the steering rod, and the steering force measuring means measures the force or torque exerted on the steering wheel during rotation of the steering wheel about the rotational axis of the steering rod.

The method of using the defect detecting device comprises:

(a) retaining the first side of the vehicle from movement in the direction of the first side;

(b) retaining the second side of the vehicle from movement in the direction of the second side;

(c) rotating each of the vehicle's front wheels;

(d) rotating the steering wheel in a first direction through a first angle of rotation from the center position so that the vehicle is urged against the first retaining means with a first force;

(e) obtaining a first steering force value by measuring the force or torque exerted on the steering means to maintain the position of the steering wheel at the first predetermined angle;

(f) obtaining a first urging force value by determining the force exerted by the first side of the vehicle on the first retaining means while the steering wheel is maintained at the first predetermined angle;

(g) rotating the steering wheel in a second direction from the center position through a second angle so that the vehicle is urged against the second retaining means with a second force;

(h) obtaining a second steering force value by measuring the force or torque exerted on the steering means to maintain the position of the steering wheel at the second predetermined angle;

(i) obtaining a second urging force value by determining the force exerted by the second side of the vehicle on the second retaining means while the steering wheel is maintained at the second predetermined angle;

(j) mathematically comparing the first and second force values to determine if there is a steering or front-end alignment defect in the vehicle.

BRIEF DESCRIPTION OF THE DRAWINGS

In the accompanying drawings, one particular embodiment of the present invention is illustrated wherein:

FIG. 3 is another enlarged pictoral view further revealing the placement and structure of the side retainer with the force transducer mounted therein; and FIG. 4 is an enlarged pictoral view illustrating the structure and mounting of the angular rotation measuring device and the rotational force measuring tool on the steering wheel of an automobile being tested.

DETAILED DESCRIPTION OF THE PREFERRED EMBODIMENT

Figure 1:
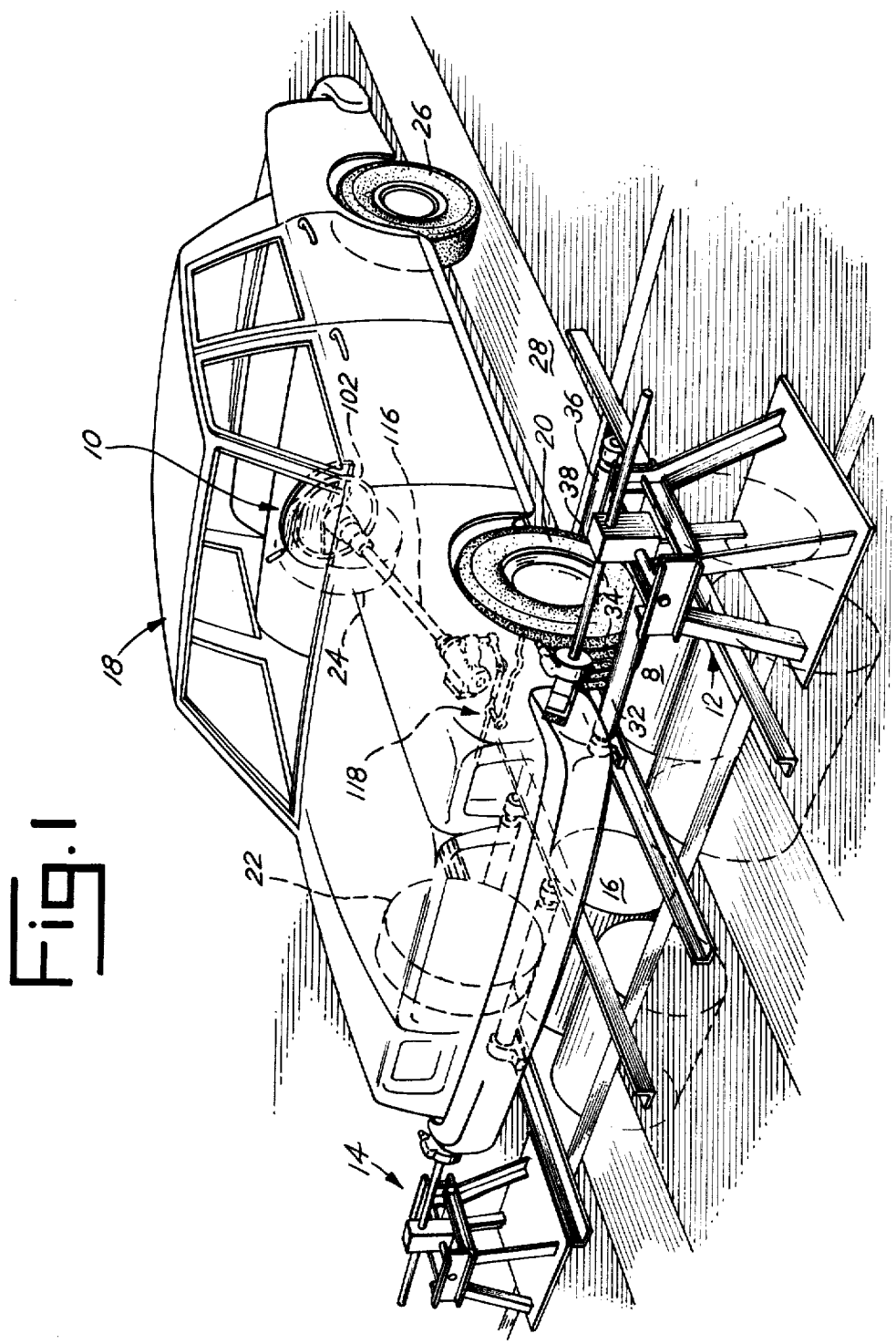
FIG. 1 is a pictoral view of the apparatus when utilized to test an automobile.

With reference to FIG. 1, the preferred apparatus (a steering wheel rotating angle and force determining device, generally 10, a left side motion retainer, generally 12, and right side motion retainer, generally 14), is used to test an automobile 18 for steering and front-end alignment defects. The preferred apparatus 10, 12, and 14 requires the aid of a device that can rotate the left 20 and the right 22 front wheels of the auto 18 at substantially identical and constant speeds while the rear wheels 24 and 26 (26 not shown in FIG. 1) rest on a horizontal, planar support floor 28. The preferred apparatus 10, 12, and 14, utilizes the two co-axial, horizontal rollers 8 and 16 of a chassis brake tester which are aligned perpendicular to the direction of forward motion for the auto 18. The left front wheel 20 rests on the uppermost surface of the left roller 8, and the right front wheel 22 rests on the uppermost surface of the right roller 16. The support floor 28 and the rollers 8 and 16 are arranged in space so that the auto 18 is supported as it would be on a horizontal, planar road surface during normal operation of the auto.

The automobile's left 20 and right 22 front wheels are identically held in position on the uppermost surfaces of the left 8 and right 16 power-driven rollers respectively. For example, as shown in FIG. 1 for the left front wheel 20, a left front idler roller 32, axially parallel to the axis of the left power-driven roller 8, maintains contact with lower front tread area 34 of the left front wheel 20, thereby preventing the left front wheel 20 from moving forward on, or off of, the uppermost surface of the left power-driven roller 8. Similarly, a left rear idler roller 36, also axially parallel to the axis of the left power-driven roller 8, maintains contact with the lower rear tread area 38 of the left front wheel 20, thereby preventing the left front wheel from moving rearward on, or off of, the uppermost surface of the left power-driven roller 8.

Figure 2:
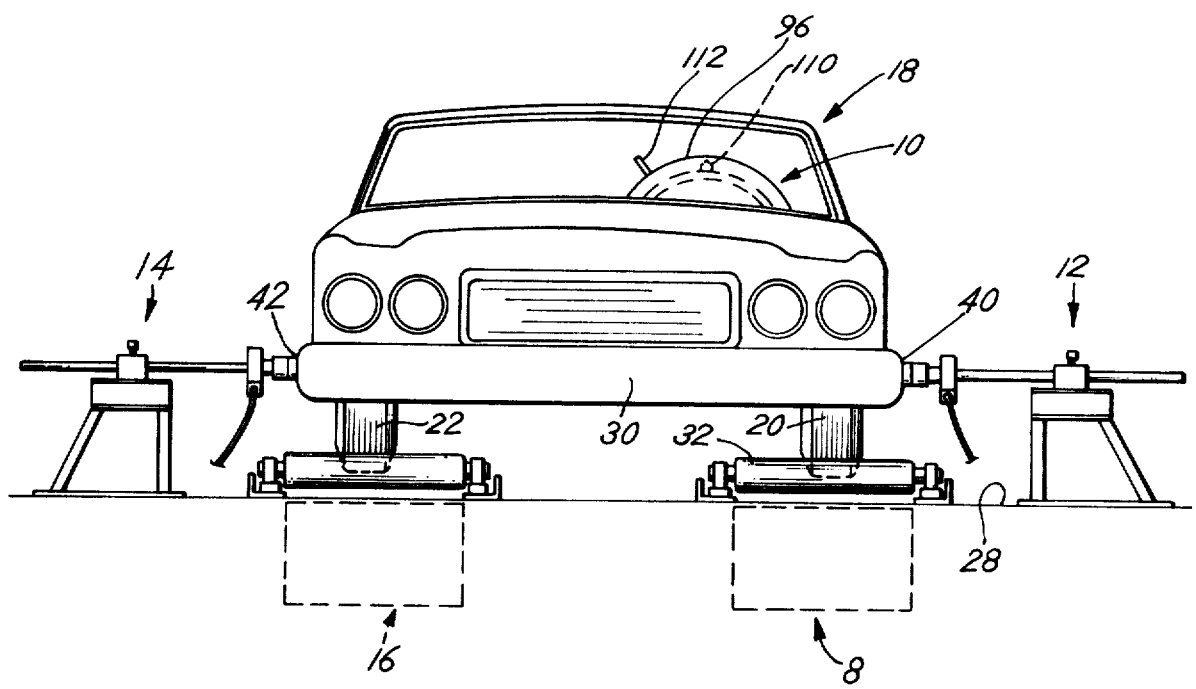
FIG. 2 is a plan view of the apparatus when utilized to test an automobile, depicting the placement of each vehicle side retainer on the side of the automobile.

Referring now to FIG. 2, the left retainer 12 abuts the left side 40 of the automobile's front bumper 30, and the right retainer 14 abuts the right side 42 of the same front bumper 30. Each of the retainers 12 and 14 are firmly mounted on the support floor 28 to firmly restrain the automobile 18 from leftward or rightward motion during testing.

The left retainer 12 and right retainer 14 are of substantially identical design and construction. For example, as shown in FIG. 3 for the left retainer 12, a steel base 56 is welded to a planar steel portion 58 in the vehicle support floor 28. The upper portion, generally 44, of the base 56 is somewhat boxlike with two opposing vertically taller sides 46 and 48 and two opposing vertically smaller sides 50 and 52. The sides 46, 48, 50, and 52 of the upper portion 44 each lie in vertical planes with the uppermost edge of the smaller sides 50 and 52 being horizontal, coplanar, and at about the same height above the support floor 28 as the bottom edge of the automobile's front bumper 30. Each of the sides 46, 48, 50, and 52 are also about one foot wide. The side of the base's upper portion 44 nearest the automobile is a smaller side 50 spaced one to two horizontal feet from the left side 40 of the bumper 30 and is in a plane parallel to the direction of forward motion for the automobile 18.

A first steel rod 54, approximately one foot long by one and one-half inches in diameter, is welded at each end into circular apertures 60 and 62 in each of the taller sides 46 and 48 about two inches above the height of the bottom edge of the automobile's bumper 30. The diameters of the circular apertures 60 and 62 are only slightly larger than the diameter of the first steel rod 54, thereby providing a close fit for proper welding of the rod 54 within the apertures 60 and 62. The apertures 60 and 62 both lie along a line that is parallel to the direction of forward motion for the auto 18. Within the perimeter of the sides 46, 48, 50, and 52 of the upper portion 44 of the base 56, the first steel rod passes entirely through a lower, tubular passageway 66 in the lower half 68 of a boxlike steel block 64. The diameter of the lower passageway 66 is only slightly larger than the diameter of the first steel rod 54. The steel block 64 is thus rotatable in a vertical plane around the first steel rod 54 and is lockable in position on the first rod 54 by means of a lower locking screw 70 that passes through a lower threaded hole 72 in the bottom face 74 of the steel block 64 and penetrates the lower passageway 66 in the block 64 to firmly abut the first steel rod 54.

When locked in an upright position on the first rod 54, the steel block 64 extends upward from the first steel rod 54 four to five inches above the height of the uppermost edges of the smaller sides 50 and 52 of the boxlike upper portion 44 of the retainer 12. In the upper half 76 of the block 64, at a point in height above the support floor about equal to that of the vertical center of the auto's front bumper 30, is the axial center of an upper passageway 76, perpendicular to the lower passageway 66 in the block 64. The diameter of the upper passageway 76 is approximately identical to the diameter of the lower passageway 66 and is also penetrated by an upper locking screw 92 that passes through an upper threaded hole 76 in the uppermost face of 82 the block 64.

A second steel rod 80, approximately three to four feet long by one and one-half inches in diameter, passes through the upper passage 78 in the block 64. When the block 64 is in the upright position, extending vertically above the first steel rod 54, the second rod 80 is therefore parallel to the plane of the support floor 28 and perpendicular to the direction of forward motion for the auto 18.

The end of the second rod 80 nearest the side of the auto 18 is threaded and mounted thereon is a force transducer 86, such as a Daytronic Corporation Series 400 Strain Gauge Load Cell. On the side of the force transducer 86 opposite the second steel rod 80, a body clamp 88 is mounted. The body clamp has a pad 90 made of resilient material firmly mounted on the steel portion of the clamp 88 opposite the force transducer 86.

By loosening the lower locking screw 70 in the block 64, the second steel rod 80 is thus rotatable in a plane perpendicular to the direction of forward motion for the auto 18. By loosening the upper locking screw 92 in the block 64, the body clamp 88 on the second steel rod 80 is movable toward or away from the block 64. The body clamp 88 may thus be positioned virtually anywhere along the side of the automobile 18 within the plane of rotation of the second steel rod 80. When the body clamp 88 is positioned against the side 40 of the bumper 30 and the locking screws 70 and 92 are screwed tightly against their respective steel rods 54 and 80, the retainer 12 solidly restrains the automobile 18 from movement in the direction of the retainer 12.

As also shown in FIG. 3, a suitable force readout meter 94 is electrically connected to the force transducer 86 on the retainer 12. The electrical response of the force transducer 86 to force transmitted from the automobile 18 to the transducer 86 is converted by the force readout meter 94 into a unit of force measurement, preferably pounds. Hence, during testing, when the automobile 18 is urged in the direction of the retainer 12 on which the transducer 86 is mounted, the readout meter 94 indicates the level of force that the automobile 18 exerts on the pad of the body clamp 88.

Referring back to FIG. 1, the auto 18 (or other vehicle being tested) has a steering rod 116 and a steering wheel 102 connected to the steering rod 116 and rotatable about the steering rod's axis of rotation. The steering rod 116 is connected through a steering means, generally 118, to the front wheels 20 and 22 so that the front wheels 20 and 22 can be controlably steered by turning the steering wheel 102 around the axis of rotation of the steering rod 116.

Referring now to FIG. 4, a semi-circular angle indicating plate 96 is mounted on the steering column 98 in front of the dashboard 100 and behind the steering wheel 102 (from the operator's point of view). The diametric edge 104 of the plate 96 is horizontal and the nearest portion of the plate 96 to the floor 106 of the automobile 18. At the radial center of the plate 96 is a concentric semi-circular hole 108 which is large enough to allow the upper semi-circular half of the steering column 98 to pass through the plate 96. The indicating plate 96 is thereby mounted on the steering column so that the radial center of the plate 96 coincides with the axis of rotation of the steering wheel 102.

The radius of the indicating plate 96 is substantially greater than the radius of the steering wheel 102 by several inches. Numerical indicia is printed near the outermost radial edge 114 of the plate 96 to indicate the radial degree of change from the vertical center (as zero) on the plate 96. Thus, the outermost radial edge 114 of the plate 96 is marked to the left and right of vertical center in tens from 'zero' to 'eighty' degrees ('ninety' is not marked).

Referring still to FIG. 4, an angle indicator 110 is mounted on the steering wheel 102, protruding radially from the radial center of the steering wheel 102. When the steering wheel 102 is positioned in the center position for forward motion of the automobile 18, the indicator 110 points approximately toward the zero point on the angle indicating plate 96.

A torque wrench 112 is mounted on the steering column 98 at the center of the steering wheel 102 and extends radially from the radial center of the steering wheel 102. The torque wrench 112 thus yields torque values, preferably in foot-pounds, when the steering wheel 102 is turned by means of the torque wrench 112 to the left or right of center position during testing of the automobile 18.

With reference again to FIG. 2, when the front wheels 20 and 22 of the auto 18 are driven onto the uppermost surface of their respective rollers 8 and 16 and the auto 18 is firmly restrained from leftward and rightward motion by means of the left 12 and right 14 retainers, testing of the auto proceeds with the following steps:

(a) rotating the left 12 and right 22 front wheels at substantially identical, constant, and relatively slow speeds, preferably thirty miles per hour, by means of the left 8 and right 16 power-driven rollers;

(b) grasping the torque wrench 112 and thereby rotating the steering wheel 102 to the left of center ('zero') position, as shown on the indicator 110 on the indicating plate 96, through a relatively small leftward angle of rotation sufficient to cause the auto 18 to exert a readable measurement of leftward force (LF) on the left force readout meter 94 (not shown).

(c) obtaining a left steering torque value (LT) from the torque wrench 112 by reading the amount of torque required to hold the steering wheel 102 at the determined leftward angle of rotation;

(d) obtaining a left urging force value (LF) by reading the amount of force indicated on the left force readout meter 94 while holding the steering wheel 102 at the determined leftward angle of rotation;

(e) again grasping the torque wrench and thereby rotating the steering wheel 102 to the right of center ('zero') position, as again shown by indicator 110 on the indicating plate 86, through a rightward angle of rotation equal in magnitude to the previously determined angle of rotation;

(f) obtaining a right steering torque value (RT) from the torque wrench 112 by reading the amount of torque required to hold the steering wheel 102 at the determined rightward angle of rotation;

(g) obtaining a right urging force value (RF) by reading the amount of force indicated on the right force readout meter (not shown) while holding the steering wheel 102 at the determined rightward angle of rotation;

(h) mathematically comparing the left and right torque and force values thus obtained to determine if the auto 18 has a steering or front-end alignment defect.

There are many suitable ways of performing the final, mathematical comparison step. In the preferred method, however, the formula for comparison is based on the steering gain concept: the ratio of the left (or right) urging force value to the left (or right) steering torque value. The greater the difference between the left and right steering gain ratios, the greater the likelihood of a steering or front-end alignment defect in the auto 18.

In the preferred method, the following formula is used to yield a unitless number that indicates the degree of imbalance in the left and right steering gain ratios:

$$\frac{\frac{LF}{LT} - \frac{RF}{RT}}{\frac{LF}{LT} + \frac{RF}{RT}} \times 100 = DI$$

(The values LF, LT, RF, and RT in the formula are as defined above.) The greater the DI, i.e., the degree of imbalance, resulting from the formula, the greater the likelihood of a steering or front-end alignment defect in the auto 18 being tested.

As noted above for the preferred apparatus, a roller brake tester provides the rollers 8 and 16 for rotating the front wheels 20 and 22 at substantially identical and constant speeds. Often, however, chassis dynomometers are available for use as rollers 8 and 16 but are not capable of providing power to rotate their rollers 8 and 16. Such chassis dynomometers may nevertheless be usable in conjunction with the apparatus 10, 12, and 14 when testing front wheel drive vehicles, which can provide front wheel rotating power to the rollers 8 and 16 at substantially constant and relatively slow speeds during testing of the front wheel drive auto 18 for steering or front-end alignment defects.

While in the foregoing, there has been provided a detailed description of one particular embodiment of the present invention, it is to be understood that all equivalents obvious to those having skill in the art are to be included within the scope of the invention as claimed. For example, by varying the speeds of rotation of the front wheels, or causing them to differ, or by turning the steering wheel in unequal magnitudes of degree to the left and right, the computation of usefully comparable steering gain values may be more difficult mathematically but is not impossible or beyond the scope of invention as claimed herein.

What is claimed is:

1. An apparatus for detecting defects in vehicles having a front portion with a first side and a second side, a rear portion, at least two front wheels rotatably mounted in said front position, rear support means for mobile support of said rear portion, and steering means for steering said front wheels, said steering means including a steering rod rotatable around an axis of rotation, a steering wheel rotatably mounted about said axis of rotation and connected to said steering rod, and connecting means for steerably connecting said steering rod to said front wheels, said steering wheel being in a center position when said wheels are aligned for forward motion of said vehicle, said apparatus comprising:

wheel rotating means for rotating each of said front wheels of said vehicle when said steering wheel is turned through a relatively small angle of rotation to urge the front portion of the vehicle to move in the direction of the vehicle's first or second side;

first retaining means for retaining said first side of said vehicle from movement in the direction of the vehicle's first side, said first retaining means having a first urging force determining means for determining a first value of urging force exerted by said vehicle on said first retaining means when said steering wheel is rotated about the axis of rotation from said center position through a relatively small first angle of rotation to urge the first side of the vehicle against said first retaining means;

a second retaining means for retaining said second side of said vehicle from movement in the direction of the vehicle's second side, said second retaining means having a second urging force determining means for determining a second value of urging force exerted by said vehicle on said second retaining means when said steering wheel is rotated about the axis of rotation from said center position through a relatively small second angle of rotation to urge the second side of the vehicle against said second retaining means;

angular rotation measuring means for measuring the angular rotation of said steering wheel about the rotational axis of said steering wheel about the rotational axis of said steering rod whereby said first and second angles of rotation of said steering wheel can be made to be approximately equal in magnitude; and rotational force measuring means for measuring the force or torque exerted on said steering wheel during rotation of said steering wheel about the rotational axis of said steering rod and whereby a first value of rotating force can be obtained when the steering wheel is rotated through said first angle of rotation and a second value of rotating force can be obtained when the steering wheel is rotated through said second angle of rotation, so that the first and second urging force values and the first and second rotating force values can be mathematically compared to determine if a steering or front-end alignment defect exists in the auto.

2. The apparatus of claim 1 wherein each of said force determining means includes a force transducer providing signal generating means for generating an electrical signal in response to the respective force exerted by said vehicle on the respective retaining means and a conversion means for converting said electrical signal into a readable measurement of said force exerted on said transducer.

3. The apparatus of claim 2 wherein each of said retaining means also includes a pad mounted on said force transducer, a stationary base, and an adjusting means for adjustably mounting said force transducer on said base, said pad providing a surface for contacting the respective side of said vehicle and transmitting said force of said vehicle on said pad to said force transducer.

4. The apparatus of claim 1 wherein each of said retaining means includes a stationary base, a block portion rotatably mounted on said base, an arm portion slidably mounted in said block portion, a force transducer mounted on an end of said arm portion, and a pad mounted on said force transducer, said pad providing a surface for contacting the respective side of said vehicle and transmitting the respective force of said vehicle on said pad to said force transducer.

5. The apparatus of claim 4 wherein each of said force determining means includes said force transducer for generating an electrical signal proportional to said force transmitted by said pad and a conversion means for converting said electrical signal into a readable measurement of force.

6. The apparatus of claim 1, 2, 3, 4, or 5 wherein said rotational force measuring means includes a torque wrench mounted on said steering means to provide a measurement of torque exerted on said steering means during rotation of said steering wheel about the rotational axis of said steering rod.

7. The apparatus of claim 6 wherein said angular rotation measuring means includes a plate removably mounted behind said steering wheel and having indicia printed thereon to provide a reading of angular rotation of said steering wheel when rotated about the rotational axis of said steering rod.

8. The apparatus of claim 6 wherein said angular rotation measuring means includes an indication plate and a reading plate, said indicating plate being removably mounted on said steering wheel and having a pointer to provide an indication of angular rotation of said wheel about the rotational axis of said steering rod, said reading plate being removably mounted behind said steering wheel and having indicia printed thereon to provide a reading of angular rotation of said pointer on said steering wheel.

9. An apparatus for detecting defects in vehicles having a front portion with a right side and left side, a rear portion, at least two front wheels rotatably mounted in said front portion, a rear support means for mobile support of said rear portion of said vehicle, and steering means for steering said front wheels including a steering column, a steering rod rotatable around an axis of rotation, a steering wheel rotatably mounted about said rotational axis and connected to said steering rod, and connecting means for steerably connecting said steering rod to said front wheels, said steering wheel being in a center position when said wheels are aligned for forward motion of said vehicle, each of said front wheels having an inner side wall, an outer side wall, and a road surface contacting portion, said apparatus comprising:

at least one wheel rotating roller, a vehicle support floor, and roller rotating means, said roller being mounted in said floor along a line substantially perpendicular to the line of forward motion for said vehicle, contacting said surface contacting portions of each of said front wheels, and providing wheel rotating means for rotating each of said front wheels when said steering wheel is turned through a relatively small angle of rotation to urge the front portion of the vehicle to move in the direction of the vehicle's first or second side;

first retaining means for retaining said vehicle from movement in the direction of the vehicle's first side;

second retaining means for retaining said vehicle from movement in the direction of the vehicle's second side, each of said retaining means having a base firmly attached to said floor, a block portion rotatably mounted in said base, an arm portion slidably mounted in said block portion, block locking means for locking the position of said block portion with respect to said base, arm locking means for locking the position of said arm portion with respect to said block portion, a force transducer mounted on an end of said arm portion, and a pad adjustably mounted on said force transducer, said pad providing a surface for contacting the respective side of said front portion of said vehicle and transmitting the respective force of said vehicle on said pad to said force transducer, and said force transducer providing signal generating means for generating an electrical signal proportional to said force transmitted by said pad and being electrically connected to a conversion means for converting said electrical signal into a readable measurement of force;

a torque wrench mounted on said steering rod whereby a first value of rotating torque can be obtained when the steering wheel is rotated about the axis of rotation from said center position through a relatively small angle of rotation to urge the first side of the vehicle against said first retaining means and a second value of rotating torque can be obtained when the steering wheel is rotated about the axis of rotation from said center position through a relatively small second angle of rotation to urge the second side of the vehicle against said second retaining means;

an indicating plate removably mounted on said steering wheel and having a pointer extending from the periphery of said steering wheel to provide an indication of angular rotation of said steering wheel about the rotational axis of said rod; and a reading plate removably mounted on said steering column behind said steering wheel and having indicia printed thereon to provide a reading of the angular rotation of said pointer on said steering wheel and whereby said first and second angles of rotation of said steering wheel can be made to be approximately equal in magnitude.

10. The apparatus of claim 9 also having a means for restraining the front wheels of said vehicle from moving forward or readward on the wheel rotating roller during testing of the vehicle.

11. The apparatus of claim 10 wherein said wheel restraining means has a left front idler roller, a left rear idler roller, a right front idler roller, and a right rear idler roller, each of said idler rollers being axially parallel to the axis of said wheel rotating roller, said left front idler roller contacting the lower front tread surface of the left front wheel, said left rear idler roller contacting the lower rear tread surface of said left front wheel, said right front idler roller contacting the lower front tread surface of the right front wheel, and said right rear idler roller contacting the lower rear tread surface of the right front wheel.

12. A method of detecting steering defects in vehicles having a front portion with a first side and a second side, a rear portion, at least two front wheels rotatably mounted in said front portion, at least one rear support means for mobile support of said rear portion and steering means for steering said front wheels, said steering means including a steering rod rotatable around an axis of rotation, a steering wheel rotatably mounted about said axis of rotation and connected to said steering rod, and connecting means for steerably connecting said steering rod to said front wheels, said steering wheel being in a center position when said wheels are aligned for forward motion of said vehicle, said method comprising:
  (a) retaining said first side of said vehicle from movement in the direction of said first side;
  (b) retaining said second side of said vehicle from movement in the direction of said second side;
  (c) rotating each of said front wheels of said vehicle;
  (d) rotating said steering wheel in a first direction through a first angle of rotation from the center position so that the vehicle is urged against the first side retaining means with a first force;
  (e) obtaining a first steering force value by measuring the force or torque exerted on said steering means to maintain the position of said steering wheel at said first angle;
  (f) obtaining a first urging force value by determining the force exerted by said first side of said vehicle on said first retaining means while said steering means is maintained at said first angle;
  (g) rotating said steering wheel in a second direction through a second angle from center position so that the vehicle is urged against the second side retaining means with a second force;
  (h) obtaining a second steering force value by measuring the force or torque exerted on said steering means to maintain the position of said steering wheel at said second angle;
  (i) obtaining a second urging force value by determining the force exerted by said second side of said vehicle on said second retaining means while said steering means is maintained at said second angle; and
  (j) mathematically comparing said first and second and force values to determine if there is a steering or a front end alignment defect in said vehicle.

13. The method of claim 12 wherein for the mathematical step:
  (a) said first steering force value is mathematically compared to said first force value to obtain a first steering gain value;
  (b) said second steering force value is mathematically compared to said second urging force value to obtain a second steering gain value; and
  (c) said first steering gain value is mathematically compared to said second steering gain value to determine if there is a steering or front end alignment defect in said vehicle.

14. The method of claims 12 or 13 wherein for step (c) each of said front wheels is rotated at substantially identical and constant speeds.

15. The method of claim 14 wherein for step (g) said second angle is substantially equal in magnitude to said first angle.

16. The method of claims 12 or 13 wherein for step (g) said second angle is substantially equal in magnitude to said first angle.

* * * * *